A. M. TOZZI.
AUTOMATIC BRAKE MECHANISM.
APPLICATION FILED FEB. 14, 1913. RENEWED JAN. 17, 1914.
1,107,868.
Patented Aug. 18, 1914.
2 SHEETS—SHEET 1.
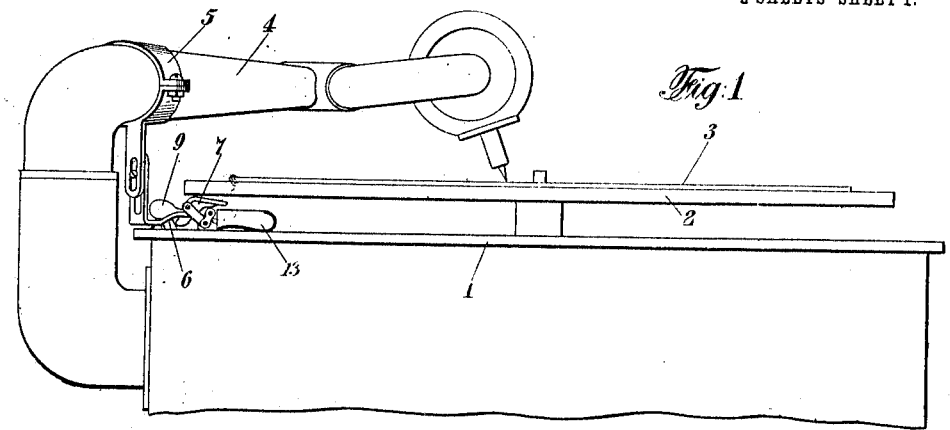
Fig. 1.
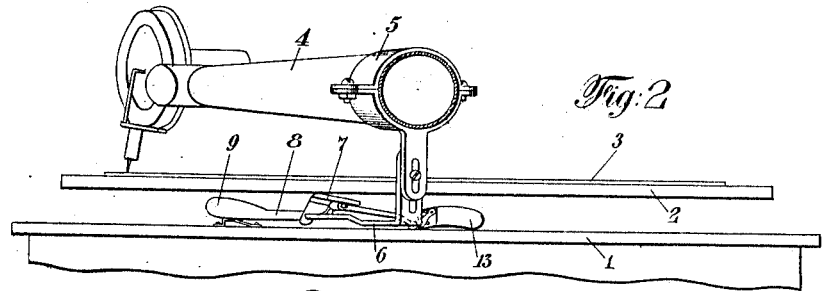
Fig. 2.
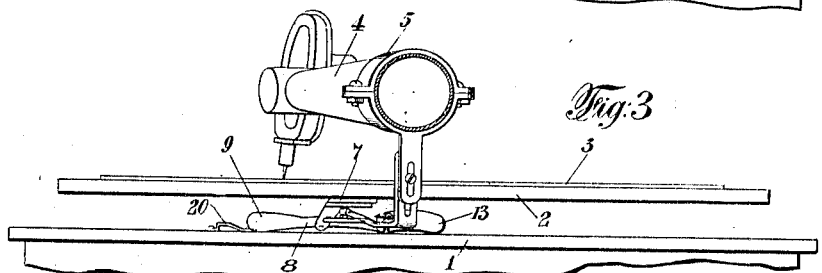
Fig. 3.
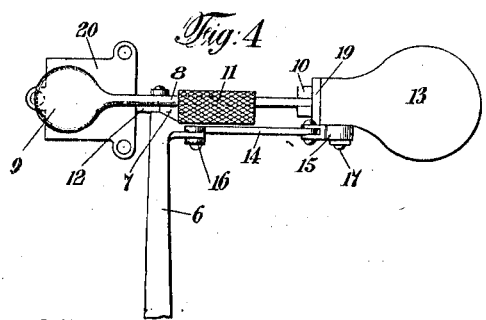
Fig. 4.
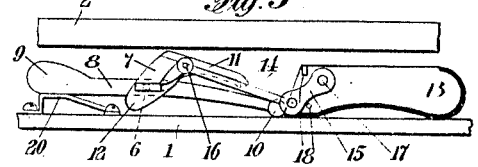
Fig. 5.
Fig. 6.
Witnesses:
May Frevert.
Frank Schuman.
Inventor
Angelo M. Tozzi
By his Attorney
W. B. Whitney A. M. TOZZI.
AUTOMATIC BRAKE MECHANISM.
APPLICATION FILED FEB. 14, 1913. RENEWED JAN. 17, 1914.
1,107,868.
Patented Aug. 18, 1914.
2 SHEETS—SHEET 2.
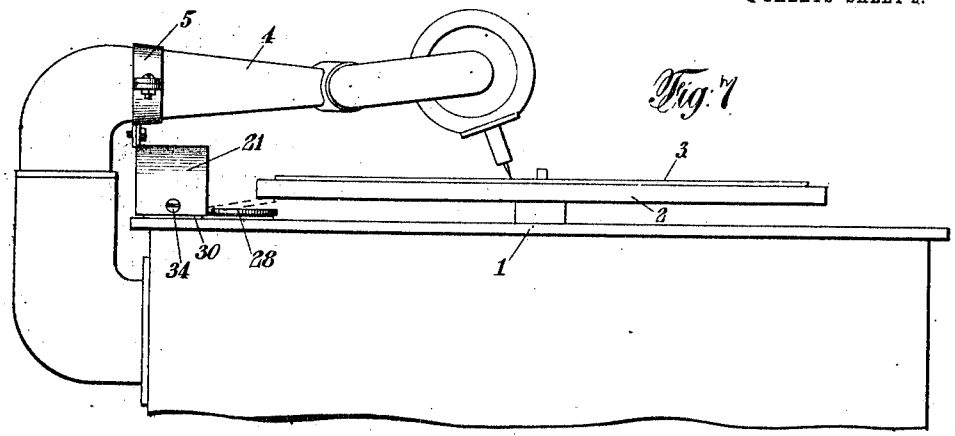
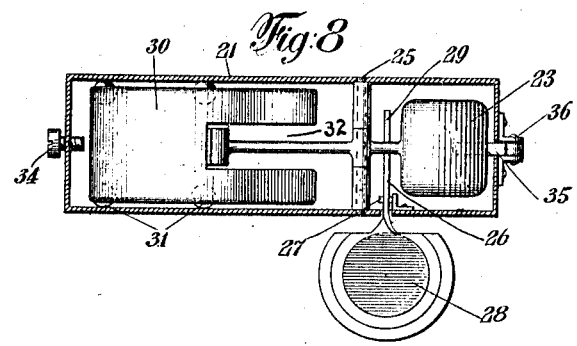
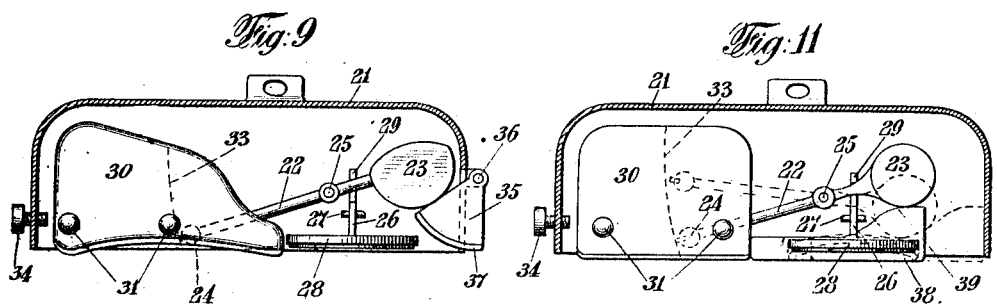
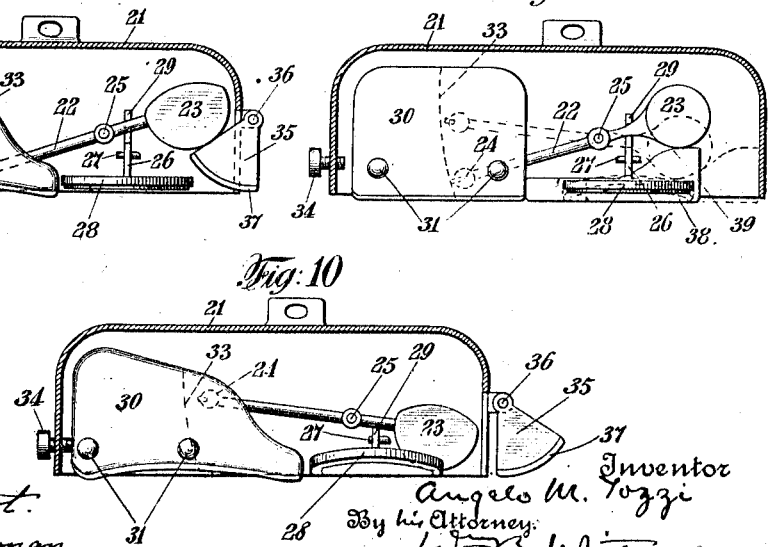
Witnesses:
May Frevert.
Frank Schuman.
Inventor
Angelo M. Tozzi
By his Attorney
W. B. Whitney

UNITED STATES PATENT OFFICE.

ANGELO M. TOZZI, OF BAYONNE, NEW JERSEY, ASSIGNOR TO CONDON-AUTOSTOP COMPANY, A CORPORATION OF NEW YORK.

AUTOMATIC BRAKE MECHANISM.

1,107,868.   Specification of Letters Patent.   Patented Aug. 18, 1914.

Application filed February 14, 1913. Serial No. 748,331. Renewed January 17, 1914. Serial No. 812,857.

*To all whom it may concern:*

Be it known that I, ANGELO M. TOZZI, a subject of the King of Italy, residing at Bayonne, in the county of Hudson and State of New Jersey, have invented certain new and useful Improvements in Automatic Brake Mechanism, of which the following is a specification.

My invention relates to automatic brake mechanism, designed primarily for use in connection with talking machines of the rotary disk type but which may be found useful in other and different connections.

The object of the invention is to provide a brake for disk talking machines which will automatically stop the machine when the end of a selection is reached and will release it when the sound-arm is turned back to starting position and which at the same time can be cheaply made and sold at a low price, can be readily attached to any standard talking machine, is simple in construction and operation so that it cannot get out of order, and requires no adjustment or regulation on account of variations in the pitch or the length of the sound-grooves of the records used. In fulfilment of this object I have produced a brake which is actuated by gravity and friction, without the employment of springs or other mechanism which is liable to get out of order. The said gravity brake, as applied to a talking machine, consists, broadly, of a brake member which is mounted to move with the sound-arm in close proximity to the rotary turn-table, a weight tending normally to set the brake against the turn-table, and means operative while the sound-arm is swinging inwardly to hold the weight inoperative and to release it when the sound-arm reaches the limit of its inward motion. Means are also provided to automatically raise the weight and release the brake when the sound-arm is swung outwardly to starting position.

The principle of my invention and the construction and operation of certain forms of brake mechanism embodying and applying such principle will be understood from the following description when read in connection with the accompanying drawings, forming part of this specification, in which—

Figure 1 is a side elevation of the upper part of a talking machine equipped with one form of my new gravity brake, showing the sound-arm with its needle resting in the outer end of the sound-groove of the record and the brake released or in "off" position; Fig. 2, a rear elevation of the same, with a portion of the sound-arm cut away; Fig. 3, a similar rear elevation, but showing the sound-arm at the limit of its inward movement and the brake set or in "on" position; Fig. 4, a detached plan view, somewhat enlarged, of the brake mechanism with the brake in "off" position; Fig. 5, a rear elevation of Fig. 4, with portions of the top of the cabinet and the rotary turn-table; Fig. 6, a view similar to the preceding, but with the brake set; Fig. 7, a view similar to Fig. 1, showing a modified form of the brake mechanism; Fig. 8, a detached plan view of the modified brake mechanism, with casing in section, showing the brake in "off" position; Fig. 9, a front elevation of the same; Fig. 10, a view similar to the preceding, but showing the brake in "on" position; and Fig. 11, a view similar to Fig. 9, showing a modification of the means there shown for releasing the brake when the sound-arm is swung outwardly.

The same reference numerals indicate like parts throughout the several figures of the drawings.

Referring to the drawings, 1 is the top of the cabinet, 2 is the rotary turn-table supporting a disk record 3, and 4 is the sound-arm of a standard disk talking machine. Attached by a strap 5 to the sound-arm and traveling with it is a horizontal arm 6 which is adjustable vertically so as to be held slightly above the top of the cabinet and which carries pivotally mounted upon its outer end, below the outer edge of the turn-table, the brake member 7 and operating lever 8. The operating lever is enlarged or otherwise weighted at its rear trailing end 9 (referring to the direction of its movement as the sound-arm swings inwardly from the periphery toward the center of the record) and at its forward end is provided with the friction bearing or head 10. The brake member has at its upper end a flattened head 11 which, constituting the brake-shoe, extends forwardly and laterally over and normally rests by gravity upon the forward arm of the lever while its lower end 12 is thereby held in a rearwardly inclined position. The friction-block 13, which rests upon the top of the cabinet, is guided and held in operative position in front of the head on the forward arm of the lever by the pivoted links 14 and 15, the former pivoted at 16 to a lug on the horizontal arm 6 and the latter at 17 to the side of the block where its movement is limited by pins or lugs 18. The rear end 19 of the block, adjacent the head on the forward arm of the lever, is inclined at an angle so as to provide a bearing surface substantially tangential at its lower edge to the circular path of the lever head. The upper bearing surface of the brake-shoe and the lower end of the brake member, the head on the forward end of the operating lever, and the bottom of the friction-block, are all preferably made of or covered with rubber or other similar friction material. The forwardly inclined plate 20 is secured to the top of the cabinet in position to be underneath the weighted end of the operating lever when the sound-arm is swung outwardly to starting position.

The operation of the device is as follows: When the machine is started with the needle of the sound-arm resting in the outer end of the sound-groove of the record, the weighted end of the operating lever is supported upon the top of the inclined plate and the brake-shoe, resting upon the downwardly inclined forward arm of the lever, is out of contact with the turn-table. As the sound-arm is swung inwardly by the needle, carrying with it the brake and operating lever, the head at the end of the forward arm of the lever comes into contact with the rear end of the friction-block, near its lower edge, and then pushes the block along upon the top of the cabinet. The friction produced by the pressure of the forwardly moving head against the end of the resisting block being sufficient for the purpose, the weighted arm of the operating lever will be held in its elevated position after it is moved from the inclined plate and so long as the sound-arm continues to swing inwardly. When the needle reaches the end of the sound-groove and the sound-arm comes to rest, the pressure of the lever head against the end of the block will be relaxed and the weighted arm of the lever will instantly drop and set the brake, which, on being brought into contact with the rapidly revolving turn-table, will by reason of the frictional engagement be pressed more firmly against the turn-table, stopping the machine. When the sound-arm is swung back to starting position, the weighted arm of the lever will be raised by the inclined plate, thereby releasing the brake and allowing the machine to start.

In the modified form of brake mechanism illustrated in Figs. 7 to 10, an elongated casing 21, open at the bottom, is attached by the strap to the sound-arm and swings with it just clear of the top of the cabinet and in close proximity to the periphery of the turn-table. The operating lever 22, provided as before with the weight 23 at its rear end and a bearing head 24 at its forward end, extends longitudinally within the casing and is pivotally mounted upon a rod 25 which is secured at its ends in the sides of the casing. The brake member 26, pivoted at 27 within an opening in the side of the casing, is enlarged at its outer end to form the brake-shoe 28 extending underneath the outer edge of the turn-table and its other end forms a lever-arm 29 extending inwardly below the weighted arm of the operating lever. The friction-block 30 is provided with anti-friction wheels 31, or balls, bearing at its sides against the sides of the casing, and has a vertical recess 32 in its rear end to accommodate the forward arm of the operating lever the head of which is adapted to abut against the curved end wall 33 of the recess. The block is allowed a slight longitudinal movement within the forward end of the casing, the extent of such movement being regulated, if desired, by the set screw 34. The sector 35 swings upon a pivot 36 within a central vertical opening in the rear end of the casing and its periphery 37, covered with rubber or other suitable material, bears upon the top of the cabinet. The operation of this modified brake mechanism will readily be understood. The swinging of the sound-arm outwardly to start a selection will cause the pivoted sector, by reason of its frictional contact with the top of the cabinet, to swing inwardly beneath and thereby raise the weighted arm of the operating lever, allowing the brake-shoe to drop and releasing the turn-table. When the machine starts and the sound-arm begins to swing inwardly the head on the forward arm of the operating lever is pressed against the end of the friction-block to hold up the weighted arm of the lever, before the same is released by the outward swinging of the sector, and continues to hold it in its elevated position until the sound-arm comes to a stop when the end of a selection is reached, thereupon releasing the weight and setting the brake as before.

The brake mechanism illustrated in Fig. 11 differs from that last described only in the substitution of a second friction-block 38 provided with the forwardly inclined upper surface 39 for the pivoted sector as means for raising the weighted arm of the operating lever. When the sound-arm is swung outwardly this second friction-block remains stationary until the weighted arm of the operating lever has been raised to the top of its inclined upper surface and then the rear end of the first friction-block abuts against its front end and pushes it along; and, as the sound-arm swings inwardly, it again remains stationary until the weighted arm of the operating lever, supported by the pressure of the head on its forward arm against the end of the first friction-block, has moved to a position over its thin front end, and then it is pushed along by the set screw in the rear end of the casing.

While I have explained the principle of my new gravity brake in connection with what I now consider the best mode in which to apply that principle, it will, of course, be understood that the specific forms of brake mechanism shown and described may be greatly modified in its various parts and details without departing from the spirit or sacrificing the advantages of the invention.

What I claim as new, and desire to secure by Letters Patent, is—

1. In a brake mechanism, the combination, with two independently moving members, of a brake carried by and moving with one of said moving members, means actuated by gravity tending normally to set the brake against the other of said moving members, and means restraining the gravity actuated means during the continued movement of the first of said moving members and releasing the same upon the stopping of such movement.

2. In a brake mechanism, the combination, with a traveling arm and moving and stationary surfaces, of a brake carried by and moving with the traveling arm and normally held out of contact with the moving surface, means actuated by gravity to set the brake against the moving surface, and means including a friction-block resting upon the stationary surface to hold the gravity actuated means inoperative so long as the traveling arm continues to move and to release the same when the traveling arm comes to a stop.

3. In a brake mechanism, the combination, with a traveling arm and moving and stationary surfaces, of a brake carried by and moving with the traveling arm and normally held out of contact with the moving surface, means actuated by gravity to set the brake against the moving surface, means including a friction-block resting upon the stationary surface to hold the gravity actuated means inoperative until the traveling arm reaches the limit of its forward movement and then to release the same, and means to restore the gravity actuated means to inoperative position when the traveling arm reaches the limit of its backward movement.

4. A brake mechanism comprising, in combination, a traveling arm, a brake member carried by the traveling arm, a weighted lever also carried by the traveling arm and normally operative to set the brake, and a friction block adapted in coöperation with an arm of the weighted lever to hold said lever inoperative during the forward movement of the traveling arm.

5. A brake mechanism comprising, in combination, a traveling arm, a brake member carried by said arm, a weighted lever also carried by said arm and normally operative to set the brake, and two friction-blocks adapted one in coöperation with an arm of the weighted lever to hold said lever in inoperative position during the forward movement of the traveling arm and the other to raise said lever to inoperative position on the backward movement of said arm.

6. A brake mechanism comprising, in combination, a traveling arm, an open bottom casing carried by said arm, a weighted lever pivoted within said casing and extending longitudinally thereof, a brake pivoted within an opening in the side of said casing and having a lever arm extending inwardly therein below the weighted lever, and a friction-block held by said casing in position to frictionally engage an arm of the weighted lever during the forward movement of the traveling arm.

7. A brake mechanism comprising, in combination, a traveling arm, a moving surface, a stationary surface, a brake carried by the traveling arm and moving with it above the stationary surface and in proximity to the moving surface, a weighted lever also carried by the traveling arm and normally operative to set the brake against the moving surface, and means including two friction-blocks resting upon the stationary surface to hold the weighted lever in inoperative position during the forward movement and to raise the same to inoperative position on the backward movement of the traveling arm.

8. A brake mechanism comprising, in combination, a traveling arm, a rotary table, a stationary surface, a brake carried by the traveling arm above the stationary surface and in proximity to the rotary table, a weighted lever carried by the traveling arm and normally operative to set the brake against the rotary table, a friction-block resting upon the stationary surface in front of the weighted lever and adapted in coöperation with an arm thereof to hold said lever in inoperative position during the forward movement of the traveling arm, a second friction-block resting upon the stationary surface behind the weighted arm and having a forwardly inclined upper surface adapted to raise the lever to inoperative position on the backward movement of the traveling arm, and an open bottom casing carried by the traveling arm and inclosing the upper portions of the friction-blocks to maintain said blocks in operative position with respect to the weighted lever.

ANGELO M. TOZZI.

Witnesses:
W M. J. PENDER,
W. V. CONDON.